Aug. 9, 1955

C. L. TAPPER 2,714,957

CORD TESTING AND ASSORTING MACHINE

Filed Feb. 12, 1954

INVENTOR.
CARL L. TAPPER
BY
Pearson + Barson
ATTORNEYS

Aug. 9, 1955

C. L. TAPPER 2,714,957

CORD TESTING AND ASSORTING MACHINE

Filed Feb. 12, 1954

INVENTOR.
CARL L. TAPPER
BY
Pearson + Pearson
ATTORNEYS

INVENTOR.
CARL L. TAPPER
BY
Pearson + Pearson
ATTORNEYS

Aug. 9, 1955     C. L. TAPPER     2,714,957
CORD TESTING AND ASSORTING MACHINE
Filed Feb. 12, 1954     4 Sheets-Sheet 4

INVENTOR.
CARL L. TAPPER
BY
Pearson + Pearson
ATTORNEYS

United States Patent Office 2,714,957
Patented Aug. 9, 1955

2,714,957

CORD TESTING AND ASSORTING MACHINE

Carl L. Tapper, Lowell, Mass.

Application February 12, 1954, Serial No. 409,883

10 Claims. (Cl. 209—81)

This invention relates to improvements in machines for automatically testing electric cords for defects and automatically assorting such cords according to the nature of the defect found by the tests. A machine of this type is disclosed in my co-pending application, Serial No. 255,562 filed November 9, 1951 wherein an endless conveyor is provided carrying a plurality of plug-in receptacles for advancing the cords past a series of electric testing stations. In my said co-pending application, electrically actuated jaws are provided at each station, alongside the path of the cords depending from the conveyor, the jaws being arranged to first close on a cord and then to pull, or extract the cord from its plug-in receptacle when extraction is indicated by an electrical test of the cord at a particular station.

The principal object of this invention is to provide a more effective, efficient and positive apparatus for assuring that the depending terminal portions of the cords will be properly introduced into contact with an electric conducting medium.

Another object of the invention is to provide as part of such apparatus, a spring clip for holding the depending cords at a predetermined height together with mechanism for automatically opening said clips for receiving and discharging a cord.

Still another object of the invention is to provide as part of such apparatus, novel mechanism for moving a tank of electric conducting liquid into and out of the path of the depending portions of said cords for temporarily completing a circuit through the cord.

Other objects and advantages of the invention herein include the provision of means for assuring the positive grip of the extracting jaws, the positive release of such jaws after extraction, and the positive release of cords from the conveyor after the last testing station, all of which will be apparent in the following description and illustration of a preferred embodiment of the invention.

In the drawings, Fig. 1 is a diagrammatic side view of the apparatus with the side covers removed or broken away.

Fig. 6 is a fragmentary plan view in section on line 6—6 of Fig. 5.

Figure 5:
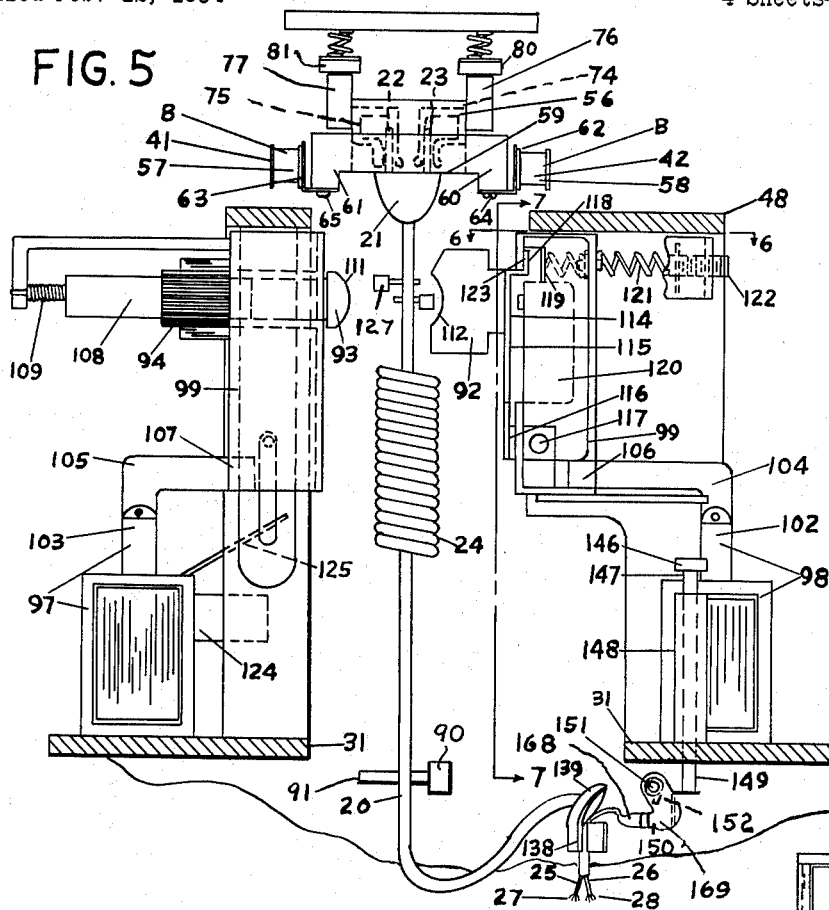
Fig. 5 is an enlarged front view in section on line 5—5 of Fig. 1 showing the assorting mechanism of the device.

The machine of this invention is designed to test and assort electric cords of the type best shown at 20 in Fig. 5, the cord 20 usually having a plug 21 with prongs 22 and 23 arranged to slidably connect with household plug-in receptacles of a well known type. The cord 20 may be six feet or more in length and is usually hanked or coiled, as at 24, and made up of two electric conducting strands 25 and 26 covered with suitable insulation. The cord 20 may have a plug such as 21 at one terminal end, and a plug or plug-in receptacle at the opposite terminal end or, as shown, the depending terminal end may have only the bared terminals 27 and 28 of strands 25 and 26.

Elongated cords such as 20 and the attached plugs such as 21 are often defective in that they are short circuited or open circuited and in view of their length, lack of rigidity and lack of rigid uniform surfaces and other factors, it is difficult to carry the same through an automatic testing and assorting machine and difficult to introduce all of the cord into electrical testing circuits automatically.

In the cord testing and assorting machine A of this invention, I provide a suitable platform 30, having a longitudinally extending slot 31 centrally disposed thereof and suitable bins 32, 33 and 34 therebelow to receive the assorted cords. A portion such as 35 is cut out of the partitions such as 36 and 37 which form the bins, to provide space for the depending loops of cords 20 as they are carried over the platform slot and bins. A skeletonized framework 38 is provided to support platform 30, and suitable covers, some not shown, may be provided to enclose the machine except for the entrance, or cord insertion opening 39.

Figure 10:
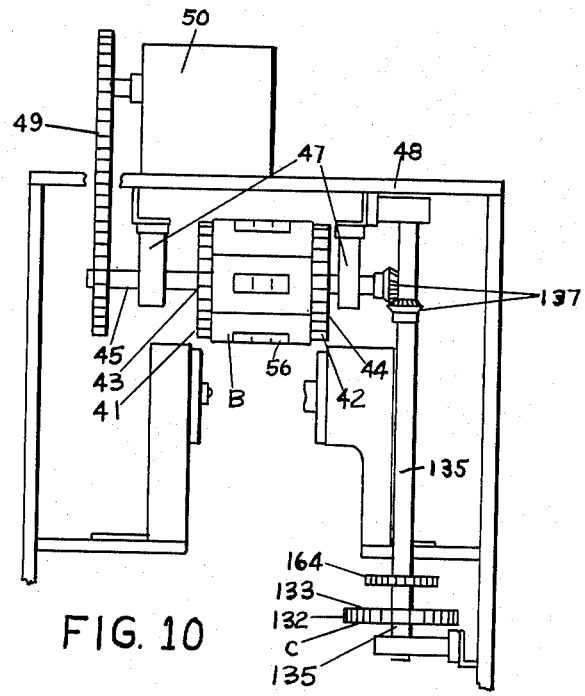
Fig. 10 is a front view in section on line 10—10 of Fig. 1 illustrating the drive connections of the device.
Figure 11:
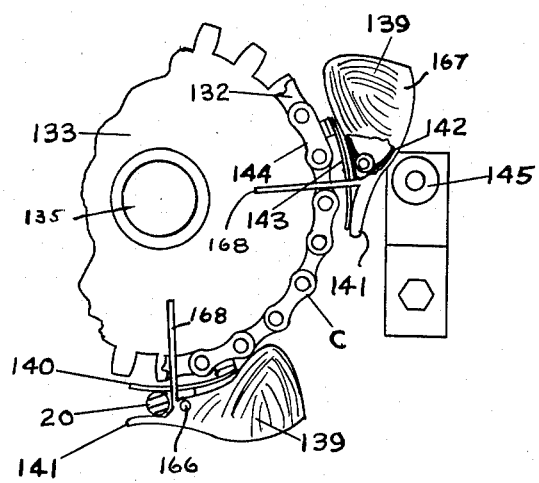
Fig. 11 is a detail plan view of the clip operating cam of the device.

An endless conveyor B in the form of a pair of parallel chains 41 and 42 is provided, each chain such as 42 being carried by sprockets such as 43 and 44 mounted on transversely extending shafts 45 and 46. (See Fig. 10.) The shafts 45 and 46 are suitably journalled in a well known manner in bearings such as 47, supported on the upper portion 48 of frame 38. Shaft 45 is driven by a chain drive 49, through a gear reduction unit 50, operated by an electric motor 51 all in a well known manner. The lower stretch 52 of conveyor B moves continuously from proximate the entrance opening 39, past the first, second and third stations 53, 54 and 55 to proximate the rear wall of the machine and thus the lower stretch 52 travels above and along the slot 31 in platform 30 and above the three bins 32, 33 and 34.

Figure 3:
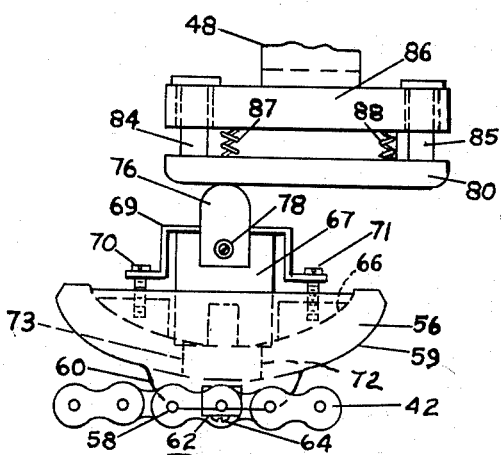
Fig. 3 is a fragmentary side view on an enlarged scale of a plug-in receptacle and yielding contact track of the device.

As best shown in Figs. 3 and 5, a plurality of plug-in receptacles 56 are spaced along conveyor B, in end to end position, and each extending transversely between pairs of oppositely disposed links such as 57, 58 of the parallel conveyor chains 41 and 42. Each plug-in receptacle 56 has a rounded outer face 59, curved to form a substantially semicircular surface, with adjacent receptacles, as the sprocket 43 is traversed by the conveyor B. A pair of integral spaced apart lugs 60 and 61 project from the face 59 of each receptacle 56, each lug being connected to an opposite link such as 57 and 58 by a plate 62 and 63 and machine screws 64 and 65. The inner face 66, of each plug in receptacle 56 is hollowed out and a casing 67 of insulating material is fixed therein by a bracket 69 and screws 70, 71. The casing 67 has a narrowed portion, or neck 72 which projects through an opening 73 in the receptacle 56 and is provided with a pair of prong-receiving members 74 and 75 (see Fig. 5) shaped to slidably receive the prongs 22 and 23 of a plug 21. Each prong receiving member 74 or 75 is preferably of spring strip metal and is attached to a rounded contact element such as 76 or 77 by screws such as 78, whereby each such contact element is electrically connected to a strand 25 or 26 of cord 20 when plug 21 is slidably seated in receptacle 56.

A pair of elongated contact tracks, or bars 80 and 81 are provided at station 53 and a similar pair of bars 82 and 83 are provided at station 54, each pair of bars being aligned with the paths of the pairs of contact elements 76 and 77 on the receptacles 56. Each bar such as 80 depends from two spaced apart posts, such as 84 and 85, carried by a suitable bracket such as 86, the bracket being attached to the frame 48. A pair of coil springs 87 and 88 are provided to permit the bar 80 to yield and then spring back to its normal position when contacted by each successive contact element such as 76. The pair of bars 80 and 81 thus connect the cord carried in each receptacle 56 into the first testing circuit at station 53 and the second pair of bars 82 and 83 connect the same cord into the second testing circuit at station 54.

A switch 90, having a contact arm 91 is provided at the third station 55, with the contact arm 91 mounted in the path of the terminal end of a cord 20 not directly under the plug 21, whereby any cord reaching station 55 will close the contact arm and actuate switch 91. As will be apparent from Fig. 9, to be explained hereinafter, each cord is electrically tested for short circuits at station 53 and extracted from its receptacle if short circuited to fall into bin 32. Each cord which survives the test at station 53, is electrically tested for open circuits at station 54 and if not open circuited, is extracted from its receptacle to fall into bin 33. Any cord which proves to be open circuited, continues on conveyor B to station 55 where it contacts and actuates switch 90 and is extracted to fall into bin 34.

Figure 1:
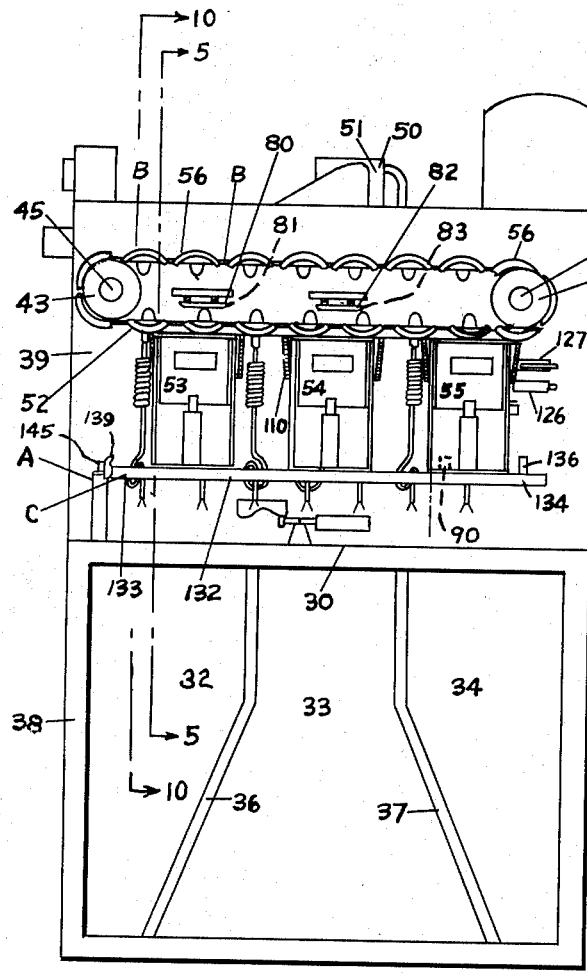

A pair of jaws such as 92 and 93 are provided at each station, the jaws being normally positioned each on an opposite side of the path of the upper portions of the cords 20 as they are carried through the machine A. Each jaw such as 93 is horizontally movable by means of a solenoid 94 to advance toward the opposite jaw 92, when the testing circuit at the station indicates extraction of the cord, and to clamp the cord between the jaws. Each opposite jaw, of each pair of jaws, is mounted for vertical sliding movement in ways such as 95 and 96 in the frame 48 and a pair of solenoids 97 and 98 are provided to draw each jaw downwardly in its ways when the jaws are clamped on a cord. Preferably, a carrier 99 is provided for each jaw, the carrier having rollers 100 and 101 mounted in the ways 95 and 96. The solenoid plungers such as 102 and 103 of solenoids 97 and 98 are bent at 104 and 105 and attached to the carrier as at 106 and 107. The solenoid plunger 108 of solenoids such as 94 and the jaws such as 93 are returned to position by a return spring 109 after the deactivation of the solenoid. Similarly, coil springs such as 110 (Fig. 1) are provided to lift the carriers 99 of each jaw back to their normal positions after the solenoids 97 and 98 have been deactivated.

I have discovered that the jaws 92 and 93 operate more efficiently in clamping a cord if the jaw 93 is outwardly curved as at 111 and if jaw 92 is inwardly curved, or indented at 112 to receive the curved portion 111 of jaw 93. Each cord 20 is thus not only clamped between the jaws but is bent thereby and thus is more positively gripped for extraction. I have also discovered that instead of forming the jaw such as 92 as the contact arm of a microswitch, as in my said copending application, it is preferable to provide considerable space for the yielding of jaw 92 upon impact from jaw 93. As shown in Fig. 5, I mount jaw 92 at the upper end 114 of an elongated metal strip 115, the lower end 116 of which strip is pivoted to the carrier 99 at 117. An integral extension 118 is provided at the top of strip 115 to strike the contact arm 119 of the microswitch 120 only after the jaw 92 has pivoted rearwardly on pivot 117 a considerable distance. The solenoid 94 of jaw 93 is thus always able to reach its sealing point, and thereby to have a longer life, even though cords of various dimensions are passed through the machine. A coil spring 121 and a tensioning screw 122 are provided to adjust the position of contact arm 119 and an abutment 123 extends downwardly from frame 48 into the path of extension 117 to act as a forward stop member. The microswitch 120 at each station is therefore caused to actuate the solenoids 97 and 98 which lower the jaws such as 92 and 93 only after the jaw 93 has yielded to permit the solenoids 94 to reach their sealing point.

As also shown in Fig. 5, I provide a microswitch 124 at the third station 55 with its contact arm 125 in the path of a descending jaw such as 93, or its carrier 99, whereby the switch will be closed each time an extraction takes place at said station. I call the switch 124, a cutout switch, because it opens the circuit to the jaw solenoid such as 94, at the third station 55, when the jaw has been lowered and the cord clamped thereby has been extracted from its receptacle 56. Such a switch is not required at stations 53 and 54 because the testing circuits at those stations automatically open the jaws after extraction.

Figure 4:
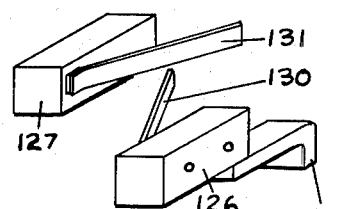
Fig. 4 is an enlarged isometric view of the crossed contact arms and pair of micro switches forming the safety stop mechanism of the device.

In Fig. 4 a pair of microswitches 126 and 127 are shown, each being mounted opposite each other, alongside the path of the cords 20 depending from receptacles 56, after the third station 55. Switches 126 and 127 are on different levels and are supported on frame 48 by means of brackets such as 128, best shown in Figs. 1 and 5. Switch 126 has an elongated contact arm 130 extending diagonally across the path of cords 20 in a horizontal plane and switch 127 has a similar arm 131 also extending diagonally across said path whereby the two arms cross each other but do not interfere with one another. The contact arms 130 and 131 are thus arranged to receive any cord not extracted at stations 53, 54 or 55 and to be actuated by such a cord to stop the machine A in accordance with the electric circuit shown in Fig. 9. Either one switch, or both switches will perform this stop function whereby there is no danger of over-travel of a cord if one of the extraction jaws fails to function properly.

Figure 2:
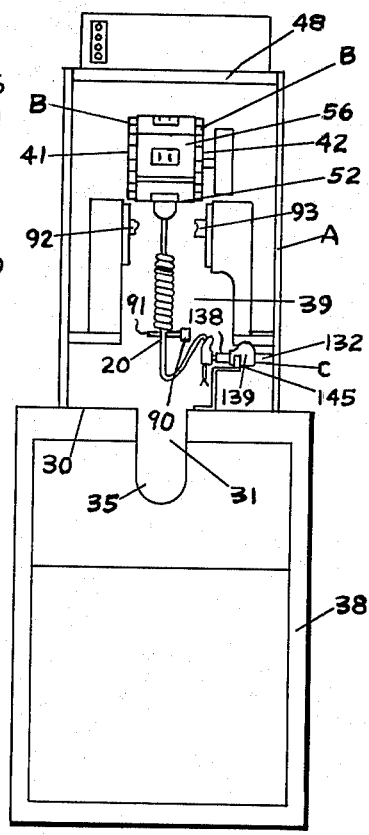
Fig. 2 is a diagrammatic front view of the device shown in Fig. 1 with front covers removed.

In my said copending application, a second carrier, traveling parallel to and below the receptacle conveyor was described, the second carrier having patches of adhesive to which the lower depending portions of a cord could be attached to guide them through the machine at the correct level. In this application, I also provide a second conveyor C positioned in a horizontal plane below conveyor A and below the jaw extraction mechanism but it is preferably inset out of the path of the cords as shown in Figs. 2 and 5. Conveyor C comprises a single chain 132, mounted on a forward sprocket 133 proximate the entrance opening 39 of machine A and a rearward sprocket 134 mounted at the rear of the machine. Sprockets 133 and 134 are carried by shafts 135 and 136, shaft 135 being power operated by drive connections 137 to the reduction unit 50 all in a well known manner. The inside stretch 138 of the chain 132 is thus arranged to travel past stations 53, 54 and 55 below chain 42 and on a horizontal plane below the hanked or coiled portions 24 of the cords 20.

A plurality of spring clips 139 are spaced along the chain 132, one clip accompanying each receptacle 56 as the receptacle travels along the lower stretch 52 of conveyor B. Each clip includes a stationary jaw 140 and a movable jaw 141 the movable jaw being held in closed position by a return spring 142 and the stationary jaw being mounted by a plate 143 on a link 144 of conveyor C. A stationary cam 145 is provided adjacent the entrance opening 39 of the machine A to automatically open each clip 139 as it rounds sprocket 133 and hold the clip open for a suitable time. The machine operator is thus enabled to simultaneously insert the plug 21 of a cord 20 into a plug in receptacle 56 on conveyor B with the left hand while placing the lower terminal portion of one cord in the open spring clip 139 on conveyor C with the right hand. For convenience, the receptacles 56 and the clips 139 are each suitably marked with numerals, or otherwise, to assure that the opposite ends of each cord are inserted in the correct receptacle and clip.

Figure 7:
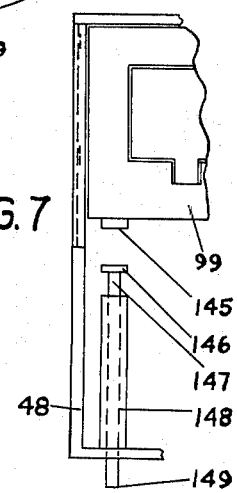
Fig. 7 is a side view on line 7—7 of Fig. 5 showing the clip releasing mechanism of the device.

As shown in Figs. 5 and 7 the carriers 99 of each jaw 92 at each station 53, 54 and 55 are provided with a stud such as 145 positioned to strike the upper end 146 of a rod 147. Each rod 147 is mounted for vertical sliding movement in a sleeve 148 carried by the frame 48 and its lower end 149 is positioned to contact a member 150, pivotally mounted at 151 to frame 48. Member 150 is arranged to open the movable jaw 141 of each clip 139, in its pivotal path and a return spring 152 is provided to return member 150 and rod 147 to normal lifted position after each such opening operation. Thus, as the pair of jaws at any station are lowered by solenoids 97 and 98 and thereby extract the plug 21 of a cord 20 from its receptacle 56 the rod 147 and member 150 at that station operate to open the clip to release the lower end of the cord. The movable jaw 141 of clips 139 is pivoted to the plate 143 at 166 and provided with a shaped outer surface 167 for contacting cam 145 as well as an extension 168, in the path of the portion 169 of member 150, for also causing the clip to open.

Figure 8:
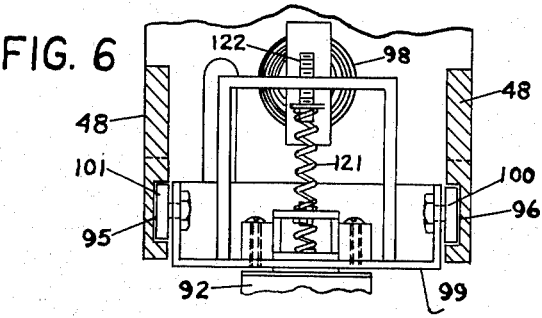
Fig. 8 is an enlarged side view partly in perspective of the mechanism for moving the electric conducting medium into and out of the path of the cords, taken from inside the machine and looking outwardly.

As shown in Fig. 8, I provide means for raising the electric conducting medium 153, which may be a vat or tank 154 containing liquid, at the station 54, up into the path of the terminal ends 27 and 28 of each cord 20 passing that station. The medium 153 is provided to complete a circuit through the entire cord as part of the test at the second station to determine the presence of an open circuit in a cord such as 20. A supporting frame 155 is provided for tank 154, carried by a bar 156 pivoted at 157 to a frame piece 158 and carrying a roller type cam follower 159 at its opposite end. A cam 160, having a cam surface 161 in contact with roller 159, is revolvable in a horizontal plane on a shaft 162, powered by a sprocket 163. A suitable drive connection to gear reduction unit 50 is provided, including a chain and a sprocket 164 on shaft 135 as shown in Fig. 8. The surface 161 of cam 160 is such that the electric conducting medium 153 is slowly raised into the path of the ends 27 and 28 of each cord 20 to gradually immerse the same in the liquid contained in tank 154, to then dwell for a short time while the testing circuit functions and then to lower the medium 153 quickly out of the path of the cords.

Figure 9:
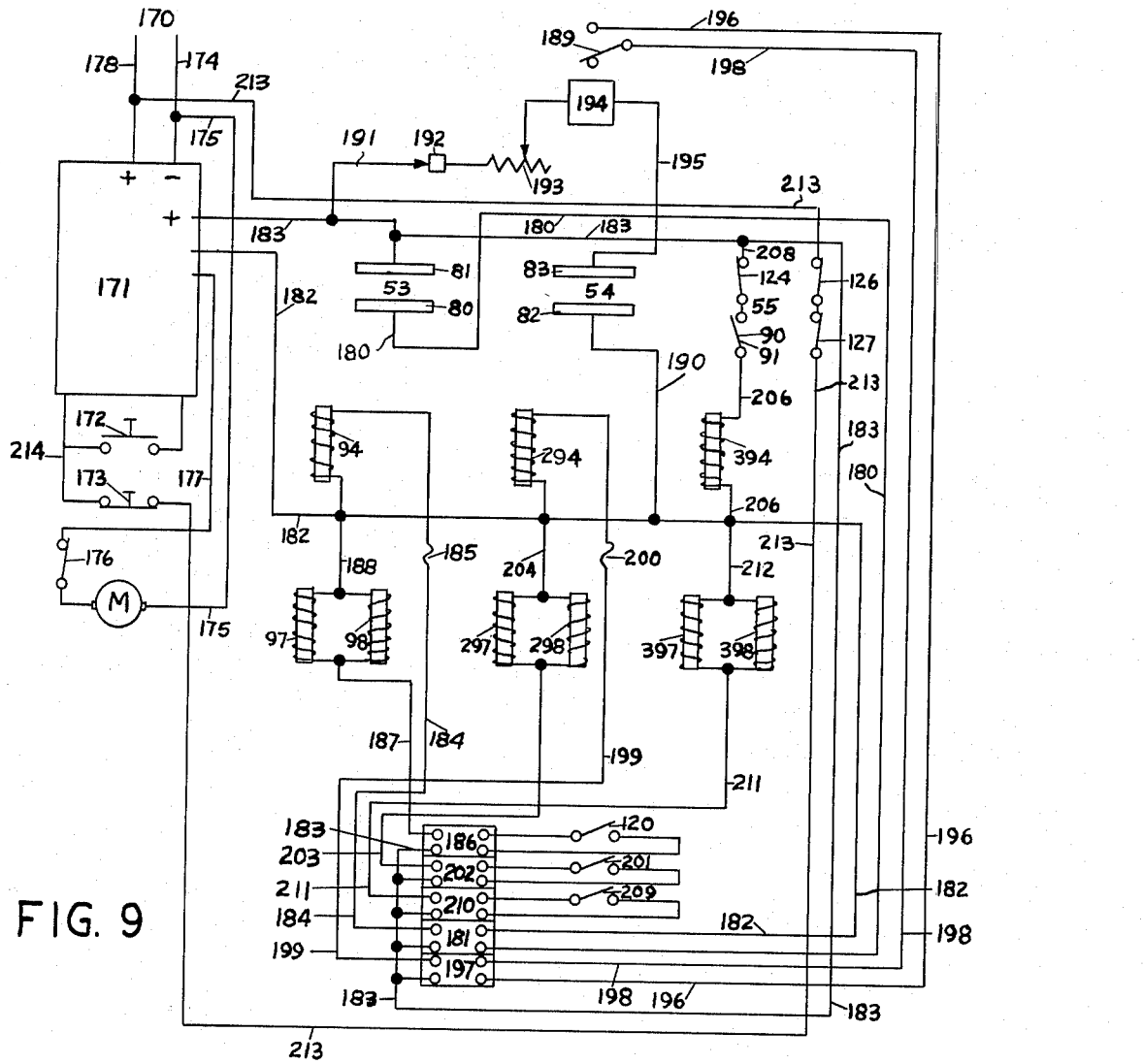
Fig. 9 is an electrical diagram of the device.

The operation of the machine is best described by reference to Fig. 9 wherein the source of electromotive force is shown at 170, the source being preferably 110 volt alternating current.

The solenoids at the first station 53 have been designated 94 for the jaw closing solenoid and 97 and 98 for the cord extracting solenoids. The jaw closing solenoid at the second station is designated 294 and the jaw closing solenoid at the third station is designated 394. Similarly the extracting solenoids at the second station 54 are designated 297 and 298 and the extracting solenoids at the third station 55 are designated 397 and 398.

A magnetic starter 171 of a well known type is provided to energize the machine A and is actuated by a starting switch 172. The momentary closing of switch 172 actuates the starter and the momentary opening of stop switch 173 deactuates the starter. Fig. 9 shows diagrammatically the initial condition of the circuit of machine A after the starter 171 has been actuated. A circuit to the motor M, which powers the endless conveyor B and C, includes the source 170, wires 174 and 175, motor M, a conveyor switch 176, wire 177, magnetic starter 171 and wire 178. Thus the conveyor B may be stopped and started separately, while the testing and other circuits are still energized, by means of switch 176.

If a short circuited cord arrives at station 53, its plug-in receptacle 56 will close a circuit through contact bars 80 and 81, that circuit including bar 80, wire 180, electronic time delay relay 181, wire 182, magnetic starter 171, wire 183, bar 81, receptacle 56 and the short circuited cord. After a predetermined lapse of time relay 181 closes a circuit including wire 183, wire 184, overload breaker 185, solenoid 94, wire 182, starter 171, back to wire 183, thus energizing solenoid 94 and closing the jaw 93 against jaw 92 with the cord clamped therebetween.

For clarity the micro switch such as 120 on the stationary jaw 92, at station 53, which is closed by the closing of the jaw 93, is shown at the bottom of the diagram. The closing of switch 120 completes an actuating circuit in electronic time delay relay 186, which after a predetermined lapse of time, completes a circuit from wire 183 to wire 187 solenoids 97 and 98, wire 188, wire 182, magnetic starter 171 and wire 183. The solenoids 97 and 98 are thus energized and pull jaws 92 and 93 downwardly to forcibly extract the short circuited cord from its plug-in receptacle 56 in conveyor B at station 53. The extraction of the cord, opens the circuit between contact bars 80 and 81, de-energizing solenoid 94, opening switch 120 which in turn de-energizes solenoids 97 and 98.

A cord which successfully passes through station 53 is carried in its receptacle 56 to station 54 and enters between the contact bars 82 and 83. It should be noted that an intermediate portion of each cord is supported in a clip on second conveyor C and is therefore simultaneously guided into the correct position at the second station for its exposed terminals 27 and 28 to be engaged by the electric conduction medium 153 in tank 154.

If a non-open circuited cord, in other words a satisfactory cord, arrives at station 54, its plug-in receptacle 56 will close a circuit through contact bars 82 and 83 that circuit including bar 82, wire 190, wire 182, magnetic starter 171, wire 183, wire 191, rectifier 192, variable resistor 193, relay 194, wire 195, contact bar 83, receptacle 56 and the cord. Relay 194 having been energized, closes switch 189 thereby closing an actuating circuit including wire 196, electronic time delay relay 197 and wire 198. Electronic time delay relay 197, after a predetermined lapse of time, completes a circuit including wire 183, wire 199, overload breaker 200, solenoid 294, wire 182, magnetic starter 171 and wire 183. The energization of solenoid 294 causes the jaws at station 54 to close, thereby closing micro-switch 201, similar to switch 120, while also gripping the cord. Switch 201 actuates the electronic time delay relay 202, which after a predetermined lapse of time, closes a circuit including wire 183, wire 203, solenoids 297 and 298, wire 204, wire 182 magnetic starter 171 and wire 183. The energization of solenoids 297 and 298 causes the closed jaws to forcibly extract the cord from its receptacle 56 on conveyor B and thereby opens the switch 201 allowing the jaws to return to their original position.

Since the cord tested at the second station was not open circuited, current flow was established therethrough by means of the medium 154 which, as explained above, was raised by cam 160 to immerse the terminals 27 and 28 at the second station. Had the cord proved open circuited, there would have been no current flow despite the fact that the terminals 27 and 28 were immersed in an electric conducting medium.

The purpose of rectifying the alternating current to direct current at the second station is that a sensitive type relay which will respond to the flow of small amounts of current is required where the conductive medium 153 is of a high dielectric quality, such as water.

It will be apparent that short circuited cords will be tested and extracted at station 53 and that non open circuited cords will be tested and extracted at station 54, the latter being the satisfactory cords. Any cord continuing on the conveyor will therefore be open circuited and upon arrival at station 55 its lower portion near its clip 139 will engage the contact arm 91 of switch 90, thereby closing the switch. A circuit is then completed through arm 91, wire 206, solenoid 394, wire 182, starter 171, wire 183, wire 208, the normally closed switch 124 back to contact arm 91, thus energizing the solenoid 394 and closing the jaws at station 55. The closing of the jaws also closes micro switch 209 which actuates electronic time delay relay 210. After a predetermined lapse of time relay 210 closes a circuit including wire 183, wire 211, solenoids 397 and 398, wire 212, wire 182, starter 171 and wire 183. The energization of solenoids 397 and 398 causes the gripped cord to be extracted and the extraction movement opens switch 124 thereby opening the circuit and allowing the jaws to return to their original positions.

Any cord overtravelling the final station 55 will contact the crossed arms of the micro switches 126 and 127 with the upper portion of the cord, and will open one or both of such switches. The opening of switch 126 or 127 opens the circuit which includes wire 213, stop switch 173, wire 214, starter 171 and wire 174, thereby stopping the machine A until the defect can be corrected.

I claim:

1. In an apparatus, for automatically testing and assorting electric cords of the class wherein a continuously moving endless carrier advances said cords individually and successively past cord testing and assorting stations and electrically actuated jaws at each station, seize and bodily extract said cords from the carrier at the first station if short circuited, at the second station if closed circuited and at the third station if open circuited, the combination with said apparatus of a second continuously moving endless carrier, uniformly spaced below and co-extensive with said first carrier, a plurality of pivoted spring clips spaced along said second carrier, each for engaging the lower portion of a cord depending from said first carrier; stationary cam means at the entrance of said apparatus for temporarily opening each clip to permit manual insertion of a cord lower portion; mechanical means, at each station, operably connected to the jaws at that station for temporarily opening a clip upon extracting movement of said jaws, an electric conducting medium at the second station extending substantially parallel to said first and second carriers, but positioned outside the path of the lower terminals of said cords and revolving cam means, synchronized with the travel of said carriers, for moving said electric conducting medium into and out of the path of the lower terminals of each successive cord for temporarily completing a testing circuit therethrough.

2. A combination as specified in claim 1 wherein said electric conducting medium includes an elongated tank of conductive liquid plus electrical means, responsive to the flow of current through said liquid, for actuating the jaws at said second station.

3. A combination as specified in claim 1 wherein said revolving cam means includes a cam surface shaped to raise said electric conducting medium slowly into the path of the lower terminals of each successive cord, to dwell in said path while a circuit is completed through said terminals and then to lower said medium rapidly out of said path.

4. A combination as specified in claim 1 wherein the mechanical means at each station for temporarily opening each clip includes a vertically slidable rod having its upper end in the path of a descending jaw at said station; and a pivoted member at said station having one surface in the path of the lower end of said rod and another surface positioned to push a spring clip at said station into open position.

5. Apparatus for automatically testing and assorting electric cords, said apparatus comprising a pair of spaced apart, continuously moving endless carriers; plug-in receptacles spaced along one of said carriers for receiving one terminal portion of each successive cord; pivoted spring clips spaced along the other of said carriers, for receiving the other terminal portion of each successive cord; at least three pairs of jaws spaced along said pair of carriers proximate the path of the cords carried therebetween; each mounted to close on a cord and remove the cord from its plug-in receptacle; electrical testing means at the first pair of jaws for testing a cord for a short circuit and causing said first jaws to seize and remove a cord from its plug-in receptacle if short circuited; electrical testing means at the second pair of jaws for testing a cord for an open circuit and causing said second jaw to seize and remove a cord from its plug-in receptacle if closed circuited; electrical means at the third pair of jaws for causing said third jaws to seize and remove a cord from its plug-in receptacle upon arrival of a cord at said third pair of jaws and mechanical means located at each pair of jaws for opening the spring clip which supports one terminal portion of a cord after the other terminal portion of said cord has been removed from its plug-in receptacle by a pair of jaws.

6. A combination as specified in claim 5 wherein one jaw of each pair of jaws is indented to receive and partially encompass the other jaw of the pair, when in closed position, thereby creating a bend in a cord engaged therebetween.

7. A combination as specified in claim 5 wherein one jaw of each pair of jaws is moved toward the other jaw by an electric solenoid and said other jaw is mounted to yield in the direction of advance of said solenoid moved jaw, thereby permitting the solenoid to reach its sealing point regardless of the thickness of a cord engaged between said jaws.

8. A combination as specified in claim 5 wherein time delay means is included in the electrical testing means at the first and second pair of jaws for delaying the closing of said jaws after said testing means have been actuated, and time delay means is included in said means for delaying the removal of a cord by any of said pairs of jaws.

9. A combination as specified in claim 5 plus a pair of contact arms, each fixed on an opposite side of the path of said cords on said carriers, after the last pair of jaws, and each having its free end extending across the other in the path of said cords and switch means, actuated by either of said arms, for stopping said apparatus.

10. A combination as specified in claim 5 plus a cut-out switch, included in said electrical means at said third pair of jaws and positioned to be actuated by said jaws after removal of cord from its plug-in receptacle for releasing the grip of said jaws.

No references cited.